(12) United States Patent
Arbel et al.

(10) Patent No.: US 11,449,479 B2
(45) Date of Patent: Sep. 20, 2022

(54) DATA MIGRATION METHODS AND SYSTEM

(71) Applicant: ACCELARIO SOFTWARE LTD., Tel Aviv (IL)

(72) Inventors: Eyal Arbel, Tel Aviv (IL); Roman Gold, Rishon Lezion (IL); Michael Litner, Modiin (IL)

(73) Assignee: ACCELARIO SOFTWARE LTD., Tel Aviv (IL)

( * ) Notice: Subject to any disclaimer, the term of this patent is extended or adjusted under 35 U.S.C. 154(b) by 26 days.

(21) Appl. No.: 17/257,995

(22) PCT Filed: Aug. 6, 2019

(86) PCT No.: PCT/IL2019/050894
§ 371 (c)(1),
(2) Date: Jan. 5, 2021

(87) PCT Pub. No.: WO2020/031184
PCT Pub. Date: Feb. 13, 2020

(65) Prior Publication Data
US 2021/0271648 A1 Sep. 2, 2021

Related U.S. Application Data

(60) Provisional application No. 62/715,093, filed on Aug. 6, 2018.

(51) Int. Cl.
*G06F 16/00* (2019.01)
*G06F 16/21* (2019.01)
(Continued)

(52) U.S. Cl.
CPC ........ *G06F 16/214* (2019.01); *G06F 11/1435* (2013.01); *G06F 11/3433* (2013.01); *G06F 16/217* (2019.01); *G06F 16/254* (2019.01)

(58) Field of Classification Search
CPC ........ G06F 16/11; G06F 16/119; G06F 16/21; G06F 16/214; G06F 16/217;
(Continued)

(56) References Cited

U.S. PATENT DOCUMENTS 8,010,753 B2 * 8/2011 Zohar ..................... G06F 3/067
711/E12.016
8,055,863 B2 * 11/2011 Maki .................. G06F 11/2069
711/E12.016
(Continued)

FOREIGN PATENT DOCUMENTS

CN         106487599 A   *  3/2017
WO    WO-2006085315 A2  *  8/2006   .......... G06F 11/3447
(Continued)

OTHER PUBLICATIONS

International Search Report dated Nov. 21, 2019 (5 pages).
Written Opinion of the International Searching Authority for PCT/IL2019/050894; dated Nov. 21, 2019; pp. 1-4.

*Primary Examiner* — Diedra McQuitery
(74) *Attorney, Agent, or Firm* — AEON Law, PLLC; Adam L. K. Philipp; David V. H. Cohen

(57) ABSTRACT

A computerized system and method of migrating data from a source database of a source host to a target database of a target host, including executing a first number of extraction components on the source host, executing a second number of send components on the source host, executing a third number of store components on the target host, and executing a monitor component to monitor performance of the source database, source host transient memory, target host transient memory, and the target database, and responsively, according to a pre-defined state table, changing at least one of the number of extraction, send, and store components being executed.

16 Claims, 2 Drawing Sheets

(51) Int. Cl.
   *G06F 11/14* (2006.01)
   *G06F 11/34* (2006.01)
   *G06F 16/25* (2019.01)

(58) Field of Classification Search
   CPC ...... G06F 16/254; G06F 16/27; G06F 3/0605; G06F 3/061; G06F 3/0647; G06F 3/067; G06F 11/1435; G06F 11/3433; H04L 12/4625
   See application file for complete search history.

(56) References Cited

U.S. PATENT DOCUMENTS

| | | |
|---|---|---|
| 8,484,161 B2 | 7/2013 | Baker et al. |
| 9,058,119 B1 | 6/2015 | Ray et al. |
| 2015/0019478 A1 | 1/2015 | Buehne et al. |

FOREIGN PATENT DOCUMENTS

| | | | | |
|---|---|---|---|---|
| WO | WO-2018031339 A1 * | 2/2018 | ............. | G06F 13/28 |
| WO | 2020031184 A1 | 2/2020 | | |

* cited by examiner

DATA MIGRATION METHODS AND SYSTEM

CROSS REFERENCES TO RELATED APPLICATIONS

This application is a U.S. national phase entry of, and claims priority to, PCT International Patent Application No. PCT/IL/2019/050894, filed Aug. 6, 2019, which claims priority to U.S. Provisional Patent Application No. 62/715,093, filed Aug. 6, 2018. The entire contents of the above-referenced applications and of all priority documents referenced in the Application Data Sheet filed herewith are hereby incorporated by reference for all purposes.

FIELD OF THE INVENTION

The invention generally relates to the field of data processing and in particular migration of databases.

BACKGROUND

Migrating (i.e., copying) data between computer systems is a common task for information technology (IT) organizations. Data may be migrated on a recurring basis between a production system and a development system, or as part of a backup or data warehousing operation. Migration may also be required when a system is moved to a new data center or to a cloud-based facility. Bottlenecks during the migration process frequently lead to the need for manual administrator intervention.

SUMMARY

Embodiments of the present invention provide a system and methods, executed by a system of distributed processors, for migrating data from a source database of a source host to a target database of a target host, including: executing a first number of extraction components on the source host, the first number being limited by an extraction threshold parameter, wherein each extraction component transfers a portion of the data as a data package from the source database to a source host transient memory; executing a second number of send components on the source host, the second number being limited by a send threshold parameter, wherein each send component transmits a data package from the source host transient memory, as stored by an extraction component, to a receive component on the target host, and wherein each receive component transfers a data package received from a send component to a target host transient memory; executing a third number of store components on the target host, the third number being limited by a store threshold parameter, and wherein each store component transfers to the target database a data package from target host transient memory, as stored by a receive component; and executing a monitor component to monitor performance of the source database, the source host transient memory, the target host transient memory, and the target database, and responsively, according to a pre-defined state table, changing at least one of the number of extraction, send, and store components.

In some embodiments, states specified in the predefined state table may be defined as being less than or greater than a given value for a maximum target performance. Alternatively or additionally, states specified in the predefined state table may be defined as being less than a target minimum performance, within an optimal performance range, or greater than a maximum performance Changing the number of extraction components, send, or store components may include changing at least one of the respective extraction, send or store threshold parameters.

The first number of extraction components may include two or more components that operate in parallel to transfer chunks of data from a chunk queue to the source local map. Alternatively or additionally, the first number of extraction components may include two or more components operating in parallel to select data from a single table of the source database, allocating the data according to a modulo ("MOD") parameter. The data may include one or more of table rows, table columns, collections, stored procedures, indexes, and views.

In further embodiments, the monitor component may be further configured to receive and store status indicators of package progress from the source database to the source host transient memory, to the target host transient memory, and to the target database, in order to perform recovery in the event of a component or network failure by resending a lost package.

Embodiments of the present invention further provide a system configured for migrating data from a source database of a source host to a target database of a target host. The system may include the source host, having a processor and memory including instructions that when executed on the processor perform steps of: executing a first number of extraction components, wherein the first number is limited by an extraction threshold parameter, and wherein each extraction component transfers a portion of the data as a data package from the source database to a source host transient memory; executing a second number of send components, wherein the second number is limited by a send threshold parameter, wherein each send component transmits a data package from the source host transient memory, as stored by an extraction component of the source host, to a receive component on the target host, and wherein each receive component transfers a data package received from a send component to a target host transient memory. The system may also include the target host, having a processor and memory including instructions that when executed on the processor perform steps of: executing a third number of store components, wherein the third number is limited by a store threshold parameter, and wherein each store component transfers to the target database a data package from target host transient memory, as stored by the receive component of the target host. The system may also include a manager host, comprising a processor and memory including instructions that when executed on the processor perform steps of: executing a monitor component to monitor performance of the source database, the source host transient memory, the target host transient memory, and the target database, and responsively, according to a pre-defined state table, changing at least one of the number of extraction, send, and store components.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

Figure 1:
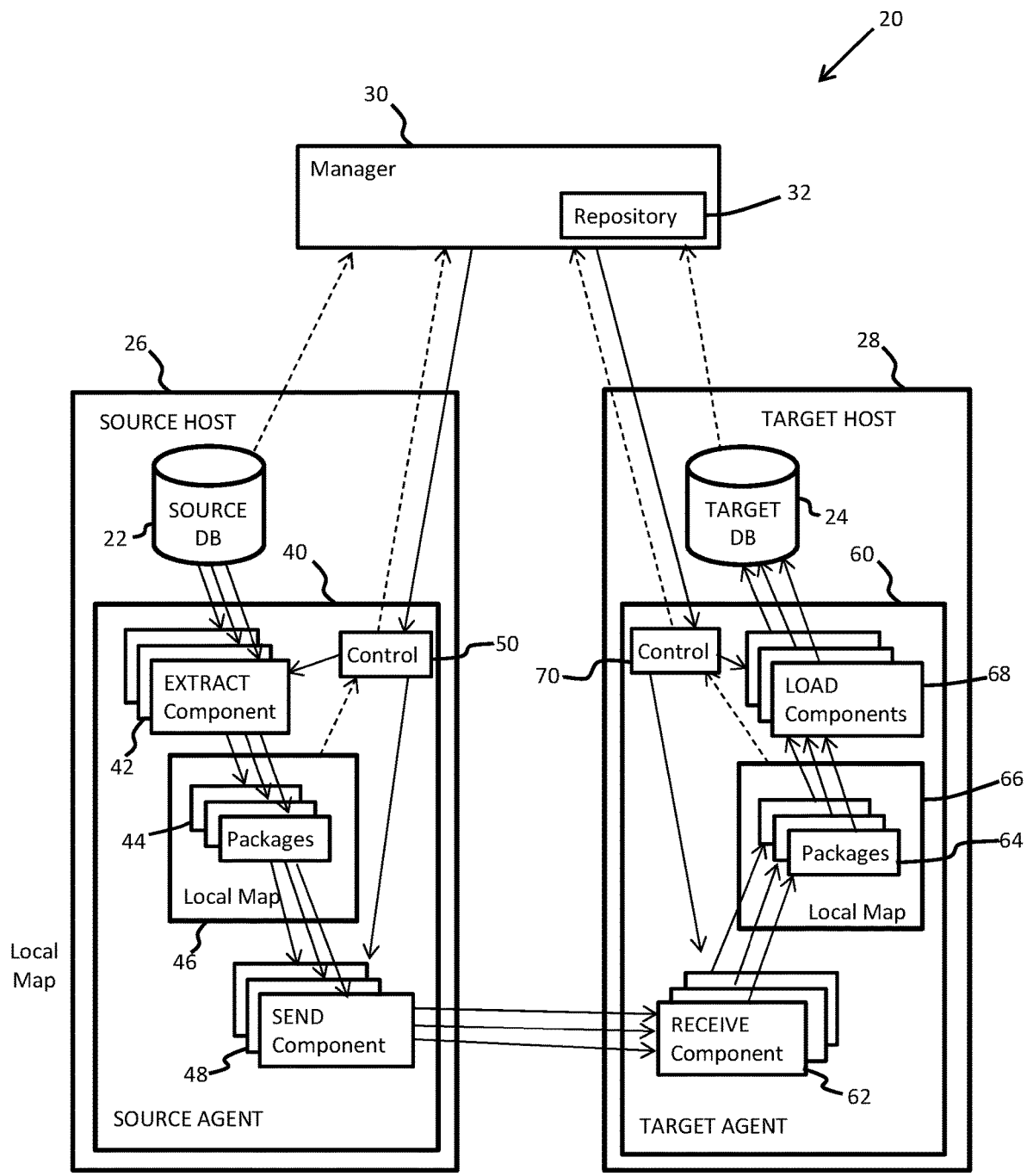
FIG. 1 is a block diagram depicting a system for migrating data between source and target databases, according to some embodiments of the present invention.

It is to be understood that the invention is not limited in its application to the details of construction and the arrangement of the components set forth in the following description or illustrated in the drawings, but is applicable to other embodiments that may be practiced or carried out in various ways. Furthermore, it is to be understood that the phraseology and terminology employed herein is for the purpose of description and should not be regarded as limiting.

FIG. 1 is a block diagram depicting a system for migrating data between a source database 22 and a target database 24, according to some embodiments of the present invention. The source database 22 is accessible and typically located in physical proximity to, or configured with, a source host 26, and the target database 24 is accessible and typically located in physical proximity to, or configured with, a target host 28. Hereinbelow, the term "hosts" refers to computer systems, such as computer servers, that are addressable over a network, such as a local area network (LAN) or a wide area network (WAN). In some embodiments, one or both of the source and target hosts are cloud-based servers. The term "component" refers to one or more computer processes configured to operate in unison on a given host to perform tasks described for the associated component. Components described below include extract, send, receive, load, and monitor components.

A computer application indicated in the figure as a manager 30 is configured to perform tasks described below to control the migration of data from the source database to the target database. The manager 30 runs on a manager host, which may be the source host, the target host, or on a third, independent host. In addition, the manager 30 may be distributed across multiple hosts, including one or more of the source and target hosts. The manager 30 includes a monitor component that monitors performance indicators associated with the operation of the source and target hosts. In response to these indicators, the manager 30 automatically optimizes settings for data migration, as described further hereinbelow. Data migration settings and other parameters of migration described below may be stored in a manager repository 32.

Data moved from the source database to the target database is typically data structured in the form of tables, or structured according to other well-defined database formats (e.g., collections, structure files, etc.). Before data migration begins, migration settings are provided to the repository 32 by a system administrator. The migration settings include information such as the address and environment (i.e., operating system and database type) of the source host, the source database, and the source database tables, as well as other objects stored with the source database, such as stored procedures, indexes, and view. Settings may also indicate specific subsets of data to migrate. In addition, settings may include the complementary target details of the target host, the target database, the target database tables, and objects, which all may be remapped, that is, named differently at the target than at the source. Migration details also include related access details, such as passwords. The data to be migrated may be specified at different levels of the database hierarchy, to include entire databases, or subsets according to partitions, schema, tables, objects, columns, rows, etc. Parameters such as data masking, data encryption, and data conversion methods may also be specified. The main features of the migration process are listed in part 3 of the Appendix.

In addition, the migration settings include parameters specifying component thresholds. These thresholds limit the load that the migration operation puts on the source and target hosts by limiting the number of concurrent components operating on these platforms. Typically three of the component thresholds that are defined are an extract threshold, a send threshold, and a load threshold, as described further hereinbelow. The migration settings typically include, as well, a threshold state table, also described further hereinbelow.

At the start of migration, a source agent 40 is executed on the source host, and a target agent 60 is executed on the target host. In some embodiments, the source and target agents are software applications developed within an event-driven application framework, such as Vert.X™ and may run on Java Virtual Machines. In some embodiments, the installation and execution of the source and target agents at the respective hosts may be automated and controlled by the manager 30.

When the source agent 40 begins operation, a source control component 50 of the source agent requests and receives migration settings from the manager 30, including information specifying the databases, tables, and objects that are to be migrated The list of tables to migrate from the source database is stored in a table queue of the source agent, together with any other specifications, such as table subset (e.g., object) information.

In addition, the source control component receives the maximum extract threshold, which sets the number of concurrent extract components 42 that should run on the source host. The source control component then initiates execution of the given number of concurrent extract components. Subsequently, the source control component continues to receive frequent updates from the manager regarding the extract threshold, as well as the send threshold, as describe further hereinbelow.

Based on the table queue, tables are assigned sequentially to extract components that are initiated. Once assigned to an extract component, the table is removed from the table queue.

By way of example, if there are ten tables specified for migration and the extract threshold is set to five concurrent extract components, the source agent starts five extract components, which begin operating on five tables in parallel. When all data of any of those five tables has been extracted, an extract component begins operating on the next table in the table queue.

Each extract component operates by extracting packages of data from the assigned table. When the database is an SQL-compliant database, packages may be extracted with an SQL SELECT instruction, e.g., "select id, name, address from employees;". Data is extracted from non-SQL databases, such MongoDB, Cassandra, with analogous commands (such as the MongoDB "find" command) If migration settings specify data masking of certain data and/or encryption, the extract components are configured to implement these features during the extraction process. Masking settings may include tables or algorithms for shuffling and substitution of fields collected in a package.

Packages typically include rows of data that are a subset of a single table. Packages are generally defined to have a preset size in terms of records or bytes. Packages may be structured to store data as rows and columns, in a format mimicking the database tabular format. This may be implemented by several standard file formats, for example, as a collection of JavaScript Object Notation (JSON) objects. Other possible formats include Extensible Markup Language (XML), comma-separated values (CSV), or a Java array list format. Packages may be configured to support multimedia databases, such that data types may include text, images, graphic objects (including drawings, sketches and illustrations) animation sequences, audio and video. In addition to the data "payload", a package may also include identifying information such as a package ID, database name, schema name, object name, timestamp of start, a timestamp of extraction completion, and a status record.

Extract components may also be configured to operate in parallel on a single table. In such a case, a source database script may be configured to extract chunks of a given table to a chunk queue of the source database, and multiple extract components are configured to transfer queued chunks to packages 44 of the source local map 46. Alternatively, multiple extract component threads may extract chunks directly from the database, each thread filtering the rows extracted by using a MOD ("modulo") parameter, which giving the remainder of a division by the mod base. For example, if four threads are operating to extract data, the first would extract a rowid with the parameter (mod 4=0), the second would extract with a parameter (mod 4=1), and so on.

Each package extracted by an extract component from the source database is held as one of the set of packages 44 in a source local map 46. The source local map 46 is a shared memory that is initialized by the source agent 26. The source local map may be configured to use no more than a pre-set, maximum amount of transient memory. The memory limit is typically set by an administrator based on constraints of memory and on performance goals of the source host. The source agent may also be configured to automatically swap packages 44 to disk when the maximum local map memory size is surpassed.

After each package is fully transferred to the source local map by an extract component, that extract component notifies the source control component of the transfer by sending an extraction status to the source control component, either by a direct inter-process communication, or by setting a local map flag. The extract component then either stops running or, in an alternative embodiment, the extract component may wait for a response from the source control component. The extraction status indicates the point in a table from which the next package should be extracted, so that extraction of the table may be subsequently renewed by a new extract component.

Upon receiving the new extraction status, the source control component may convey the status information to the manager, which in some embodiments tracks the progress of packages through the system. That is, the manager may receive and store status indicators reflecting package location and completion, from each of the source database, the source host transient memory, the target host transient memory, and the target database. Tracking package progress from start to finish allows the manager to identify lost packages that may need to be resent from the source database to the host database in order to perform recovery in the event of a component or network failure. The package status information maintained by the manager is thus used to facilitate efficient recovery from such failures by resending only lost packages.

The source control component also determines after receiving a new extraction status whether the number of currently operating extract components (i.e., number that are not waiting) is less than the extract threshold limit, given that the limit may have changed, as described further hereinbelow. If the extract threshold limit has not been reduced, that is, it is not equal to or less than the current number of operating extract components, then the source control component instructs the waiting extract component to continue its operation, or, if the extract component stopped operating, the source control component initiates a new extract component.

In addition to determining whether or not to change the current number of extract components after receiving the extraction status, the source control component determines whether or not to initialize a new send component 48, in order to process a new package in the source local map. A new send component is initialized unless the total number of concurrent send components already equals the send threshold. When the total number of send components equals the send threshold, packages that are newly transferred to the source local map wait in the local map, typically in a first-in, first-out (FIFO) queue, until they can be processed by a send component. (Initially, the source control component may start the maximum number of send components, each send component initially waiting for new packages to be extracted to the source local map.)

Each send component begins its operation by selecting the next package waiting in the source local map, and flagging or locking the package so that it is not accessed by other send components. The send component then communicates a send request to the target agent 28. Typically, the send request is an ftp or http request and is sent to an appropriate tcp port established by the target agent.

Upon receiving the send request, the target agent initiates execution of a receive component 62. Because each send component activates a complementary receive component, the number of receive components running on the target host equals the number of send components running on the source host.

The receive component 62 begins to receive the package from the send component by the initiated communications protocol (e.g., ftp or http) and transfers the package to a target local map 66, shown in the figure as storing the received packages 64. The target local map is typically defined similarly to the source local map, but the memory limits of the target local map are set according to the memory constraints and performance goals of the target host. Typically, like the source agent, the target agent is configured to automatically swap the packages 64 to disk when a maximum transient memory size is reached.

Once a package is fully transferred to the target local map, the receive component notifies the send component that that transfer is complete. The send component then deletes the transferred package from the source local map, thereby clearing memory space in the source local map.

After the given package is fully transferred, the receive component also notifies a target control component 70 of the target agent, which responsively may start a load component 68 to process the new package. The number of concurrent load components is limited by the load threshold (as communicated from the manager to the target control component). Consequently, the target control component only starts a new load component if the current number of concurrent load components is less than the load threshold.

When the total number of load components equals the load threshold, packages that are newly transferred to the target local map wait in the target local map, typically in a first-in, first-out (FIFO) queuing manner In other words, the target local map facilitates asynchronous transfer of packages from the receive component to the load component, just as the source local map facilitates asynchronous transfer of packages from the extract component to the send component.

Each load component performs the reverse operation of the extract component, that is, the load component loads a package of data to the appropriate tables of the target database 24. The migration settings may include specifications regarding converting names of the source database, table, and object names to names used at the target database. A load instruction for an SQL-compliant database may rely on the SQL insert command, for example, "insert in employees(id, name, address) values (1,'aaa','bbb')". The load component typically generates the load command on-the-fly from the migration settings (e.g., the name of the database and the field names) and by inserting into the command the data in the package being loaded.

While packages are being migrated through the system, the manager 30 monitors performance of the source and target hosts. In particular, as indicated by dashed lines of communications shown in FIG. 1, the manager receives performance measures related to the four locations where packages are held during the migration: the source database, the source local map, the target local map, and the target database. A variety of measures of database and map performance may be acquired. Database performance measures may include measures such as disk I/O wait times, seconds per read and/or write operation, disk queue lengths, and concurrent users. Database utilization measures such as transfers per second may also be monitored. Local map performance may be indicated by measures such as free memory usage and the usage of disk storage swapping, as well as by a measure of the difference between the number of packages in the two local maps. In some embodiments, the various measures may be combined to provide weighted aggregate performance scores.

Based on the measures and/or weighted aggregate scores of performance of the four package locations, the manager determines whether the overall system performance and the speed of migration can be improved by changing the number of concurrent components. Manager decisions may also be time-dependent, based on experience of past migrations (e.g., more concurrent components may be permitted at certain hours of the night).

In particular, the manager may determine whether to change the extent of parallelization, that is, whether to dynamically change the number of concurrent extract, send, and load components. If a change is warranted, meaning the number of parallel processes should be dynamically changed, the manager typically implements the change by changing the thresholds for the maximum allowable parallel components and communicating the new threshold values to the source and target agents. The source and target agents, as described above, refer to these thresholds before initiating (or "spawning") new components or before allowing components to process additional packages.

In some embodiments, the manager's determination of threshold is based on a threshold state table that is predefined and stored in the repository. The threshold state table defines, for different states of package location performance, how the different component thresholds should be adjusted from their previous level. Because the source and target hosts may continue to operate in a production mode during migration, the state table is typically configured in advance to establish and to maintain performance within a range that balances the goal of optimal migration speed with the goal of optimal operation of on-going production tasks.

Samples of state tables are shown in the Appendix. A first exemplary state table provided in the Appendix shows how threshold changes may be based on three possible states of measured performance—overloaded, optimal, and low—for each of four measured performance values, each of the performance values reflecting a load on one of the package locations, that is, at the source and target databases and at the source and target local maps. A second exemplary state table shows how threshold changes may be based on two possible states of measured performance (Overloaded and Low) for each of the four performance measures.

The first line of the first exemplary state table of the Appendix shows, for example, that when the databases and the local maps are all overloaded, the manager decreases the extract and load thresholds and increases the send threshold.

The specific values of performance measures that define the overload, optimal, and low ranges are typically defined, like the state table itself, by an administrator before the migration and stored in the repository. The complexity of the state table may be increased to include additional performance measures (rather than weighted measures), as well as time-based state factors. Time-based factors may be an absolute time-of-day, or may be times since the start of a migration. Time-based factors are determined from performance logs of prior migrations that indicate how system loads exceeded target load levels at certain times. Based on these logs, the state table may be configured to pro-actively adjust component thresholds at given times to avoid surpassing target loads.

The state table may also include additional actions beyond changing the component thresholds. For example, certain states may also indicate that send components should compress packages before transmission to the target host.

The manager's performance monitoring may be performed on a frequent basis, such as once every second. The rate of monitoring is typically synchronized with the rate of communicating threshold parameters to the source and target control components.

Figure 2:
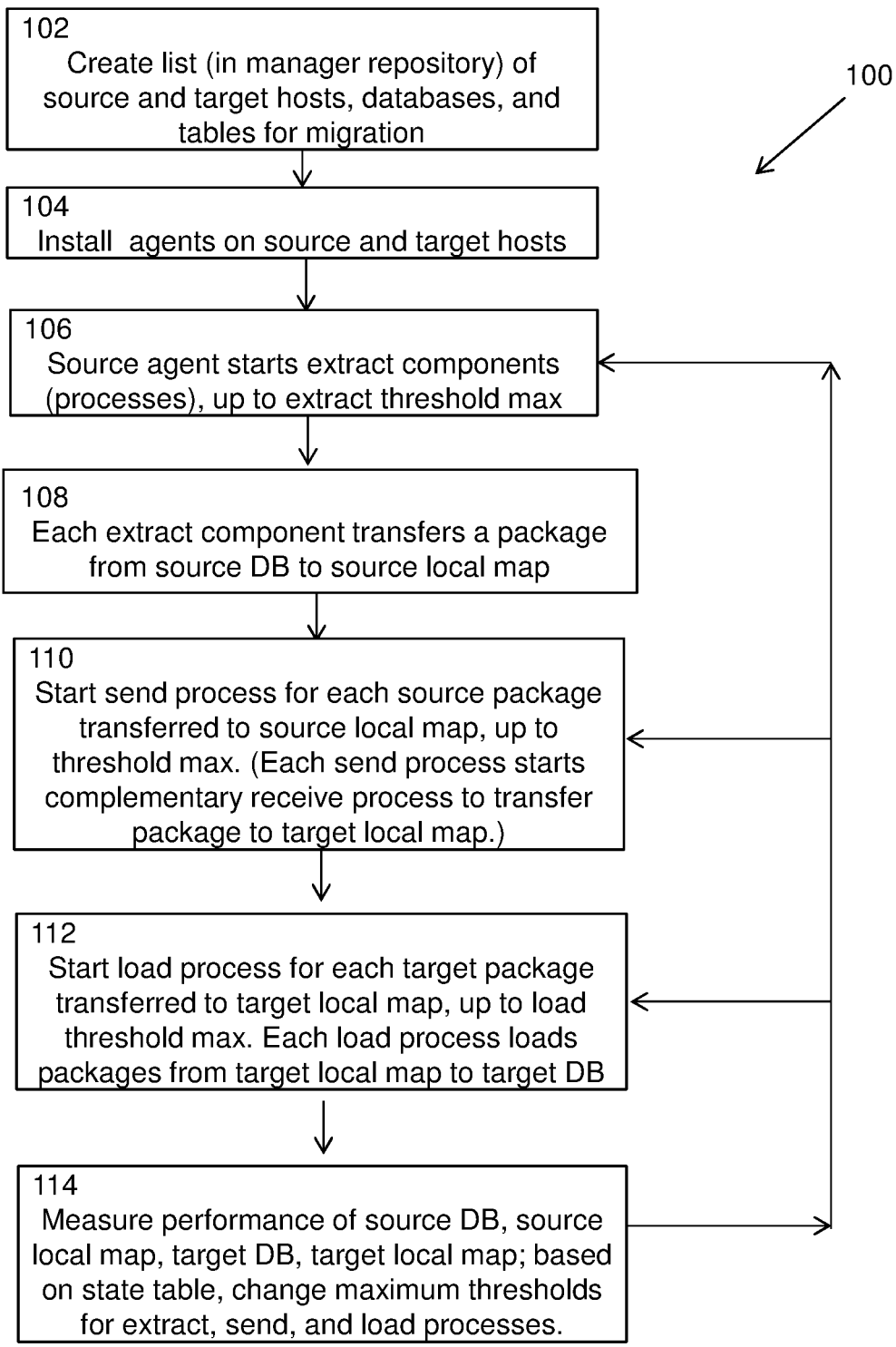
FIG. 2 is a flow diagram depicting a process for migrating data between source and target databases, according to some embodiments of the present invention.

FIG. 2 is a flow diagram depicting steps of a process 100 for migrating data between the source and target databases, according to some embodiments of the present invention. The process 100 indicates in particular the communication of packages of data between the migration components as the packages are migrated from the source database 22 to the target database 24, after the system 20 is initialized to perform the migration.

At an initialization step 102, the manager 30 receives migration information that is stored in the repository 32. This information includes addresses and access parameters of the source and target hosts, databases, tables, and objects, as well as the initial component thresholds and the state table, as described above. At a subsequent step 104, the manager installs the agents on the source and target hosts and initializes the execution of these agents.

The source control component 50, of the source agent 40, starts extract components, up to the maximum number of concurrent components, at a step 106.

As indicated by step 108, these extracted packages are then saved in the source local map 46, which facilitates asynchronous communications between the extract components and the send processes.

At a step 110, concurrent send components 48 transfer source packages from the source local map to the target host, while the number of concurrent send components is held to no more than the send threshold by the source control component 50. Each send process starts a complementary receive process to transfer a package received at the target host to the target local map 66.

At a step 112, load processes are started by the target control component 70, for each target package transferred to target local map, up to the maximum allowed by the load threshold. Each load process loads packages from the target local map to the target database. At a step 114, the manager monitors performance of source and target hosts, measuring in particular indicators of performance and/or utilization of source database, source local map, target database, and target local map. Based on a predefined state table, the manager changes maximum thresholds for extract, send, and load processes. These thresholds are then applied at steps 106, 110, and 112 to limit the number of respective concurrent extract, send, and load components. If the thresholds indicate that the number of these components should be increased, the source and target control components typically increase the number of components immediately. If the number is to be decreased, the source and target control components generally allow current components to complete packages that they are currently transferring. After transfers are complete, components stop operating if their respective threshold is below the number of current concurrent components.

It should be noted that the progress of a package is sequential, that is, the package is processed in turn by the extract, send, and load components, the components operate concurrently on many packages, while the manager operates in parallel to perform its monitoring tasks.

The system of the present invention may include, according to certain embodiments of the invention, machine readable memory containing or otherwise storing a program of instructions which, when executed by the machine, implements some or all of the apparatus, methods, features and functionalities of the invention shown and described herein. It is to be appreciated that software components of the present invention including programs and data may be implemented in ROM (read only memory), or may be stored in any other suitable typically non-transitory computer-readable medium such as but not limited to disks of various kinds, cards of various kinds and RAMs. Components described herein as software may, alternatively, be implemented wholly or partly in hardware.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; a program pre-stored e.g. in memory or on an information network such as the internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. The system may have one or more processors and one or more network interface modules. Processors may be configured as a multi-processing or distributed processing system. Network interface modules may control the sending and receiving of data packets over networks. Communications may be encrypted by methods known in the art.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

APPENDIX

1) State Table—Three-level input states (Over, Optimal, Low)

| Input | | | | Output | |
|---|---|---|---|---|---|
| Source DB load | Source localMap utilization | Target localMap utilization | Target DB load | Actions | Alerts |
| Over | Over | Over | Over | Decrease Extract Increase Send Decrease Load | |
| Over | Over | Over | Optimal | Decrease Extract Increase Send | |
| Over | Over | Over | Low | Decrease Extract Increase Send | |
| Over | Over | Optimal | Over | Decrease Extract Decrease Load | |
| Over | Over | Optimal | Optimal | Decrease Extract Increase Send | |
| Over | Over | Optimal | Low | Decrease Extract Increase Send Increase Load | |
| Over | Optimal | Over | Over | Decrease Extract Decrease Load | |
| Over | Optimal | Over | Optimal | Decrease Extract Decrease Send | |
| Over | Optimal | Over | Low | Decrease Extract Increase Load | |
| Over | Optimal | Optimal | Over | Decrease Extract Decrease Load | |
| Over | Optimal | Optimal | Optimal | Decrease Extract | Source DB is a bottleneck |
| Over | Optimal | Optimal | Low | Decrease Extract | Source DB is a bottleneck |
| Optimal | Over | Over | Over | Decrease Extract Increase Send Decrease Load | Target DB is a bottleneck |
| Optimal | Over | Over | Optimal | Increase Send Increase Load | |
| Optimal | Over | Over | Low | Increase Send Increase Load | |

1) State Table—Three-level input states (Over, Optimal, Low)

| Input | | | | Output | |
|---|---|---|---|---|---|
| Source DB load | Source localMap utilization | Target localMap utilization | Target DB load | Actions | Alerts |
| Optimal | Over | Optimal | Over | Increase Send Decrease Load | |
| Optimal | Over | Optimal | Optimal | Increase Send | |
| Optimal | Over | Optimal | Low | Increase Send Increase Load | |
| Optimal | Optimal | Over | Over | Decrease Send Decrease Load | |
| Optimal | Optimal | Over | Optimal | Increase Load | |
| Optimal | Optimal | Over | Low | Increase Load | |
| Optimal | Optimal | Optimal | Over | Decrease Load | |
| Optimal | Optimal | Optimal | Optimal | Do nothing | |
| Optimal | Optimal | Optimal | Low | Increase Load | |
| Low | Over | Over | Over | Decrease Extract Decrease Load Decrease Send | Target DB is a bottleneck |
| Low | Over | Over | Optimal | Increase Load | |
| Low | Over | Over | Low | Increase Load | |
| Low | Over | Optimal | Over | Decrease Extract Decrease Load | Network is a bottleneck |
| Low | Over | Optimal | Optimal | Decrease Extract | Network is a bottleneck |
| Low | Over | Optimal | Low | Decrease Extract | Network is a bottleneck |
| Low | Optimal | Over | Over | Decrease Send Decrease Load | Target DB is a bottleneck |
| Low | Optimal | Over | Optimal | Increase Load | |
| Low | Optimal | Over | Low | Increase Load | |
| Low | Optimal | Optimal | Over | Decrease Load | |
| Low | Optimal | Optimal | Optimal | Increase Extract | |
| Low | Optimal | Optimal | Low | Increase Extract | |

2) State Table: two-level input states (Over, Low)

| Input | | | | Output | |
|---|---|---|---|---|---|
| Source DB load | Source localMap utilization | Target localMap utilization | Target DB load | Actions | Alerts |
| Over | Over | Over | Over | Decrease Extract Increase Send Decrease Load | |
| Over | Over | Over | Low | Decrease Extract Increase Load | |
| Over | Over | Low | Over | Decrease Extract Decrease Load | |
| Over | Over | Low | Low | Decrease Extract Increase Send | |
| Over | Low | Over | Over | Decrease Extract Decrease Load | |
| Over | Low | Over | Low | Decrease Extract Increase Load | |
| Over | Low | Low | Over | Decrease Extract Decrease Load | |
| Over | Low | Low | Low | Decrease Extract | Source DB is a bottleneck |
| Low | Over | Over | Over | Decrease Extract Increase Send Decrease Load | Target DB is a bottleneck |
| Low | Over | Over | Low | Increase Send Increase Load | |
| Low | Over | Low | Over | Increase Send Decrease Load | |
| Low | Over | Low | Low | Increase Send | |
| Low | Low | Over | Over | Decrease Send Decrease Load | |
| Low | Low | Over | Low | Increase Load | |
| Low | Low | Low | Over | Decrease Load | |
| Low | Low | Low | Low | Increase Load | |

3) Architecture for Cloud DMS: Features

| | Production Migration | TDM | Data Integration |
|---|---|---|---|
| Copy full database | X | X | |
| Copy data and the schema. | | | |
| Copy single objects | | X | X |
| Copy data of a single table. | | | |
| May include creating table. | | | |
| May also be procedure, schema . . . | | | |
| Minimum time | X | X | X |
| Achieved by best practices of unload/load, parallelism, maybe compression. | | | |
| Zero downtime | X | | |
| Implemented by initial load + CDC | | | |
| Overwrite | X | X | X |
| Copy over existing database. | | | |
| Discovery | | | |
| Handle changing IP of agents. Useful when servers are respawned frequently (e.g. spot instances). Maybe use zookeeper, consul, fixed DNS, ELB-AWS | | | |
| Network fault tolerance | X | | X |
| Transfer by chunks with retries | | | |
| Recoverable | X | X | X |
| Continue job after any failure from the point where it stopped | | | |
| Integration into cloud management software | | X | X |
| Integration with cloud console | | | |
| Metering of the process for billing | | | |
| Data masking | | X | X |
| Mask sensitive data. Should be done on the source so the data is secure in transit. | | | |
| Data encryption | X | X | X |
| Encrypt data. Should be done to secure the data in transit | | | |
| Subsetting | | X | X |
| Choose only partial data at different levels—database, schema, table, column, and row. | | | |

3) Architecture for Cloud DMS: Features

| | Production Migration | TDM | Data Integration |
|---|---|---|---|
| Remapping Change object names in target host at different levels—database, schema, table, and column. | | X | X |
| Self-service No need of DBA | | X | X |
| Permissions Every end-user is allowed to perform only some actions on some objects | | X | X |
| Integration with devops tools/orchestration tools | | X | X |
| Support NoSQL Work with MongoDB, Cassandra, . . . | X | X | X |
| Consistent data The migrated data should be correct to some point of migration—start, end, etc . . . | | X | |
| Scheduling Schedule execution in the future—one-time or recurrent | | X | X |
| Multiple source/target endpoints in a single workflow | X | X | X |
| Recoverability in extract of single table. Continue to write packfile from the point of extract failure. TDM only features | | | |
| Entity copy Copy data from different tables that belong to a single business entity. Example: copy all data of specific customer, like payments, loans, messages, etc . . . | | X | X |
| Synthetic data Generate fake data according to some rules | | X | |
| Auditing Record every performed action of every user | | X | |
| In-place masking Mask sensitive data without migration | | X | X |
| Search Sensitive Data | | X | X |

The invention claimed is:

1. A computerized method, executed by a system of distributed processors, for migrating data from a source database of a source host to a target database of a target host, comprising:
executing a first quantity of extraction components on the source host, wherein the first quantity is limited by an extraction threshold parameter, and wherein each extraction component transfers a portion of the data as a data package from the source database to a source host transient memory;
executing a second quantity of send components on the source host, wherein the second quantity is limited by a send threshold parameter, wherein each send component transmits a data package from the source host transient memory, as stored by an extraction component, to a receive component of the target host, and wherein each receive component transfers a data package received from a send component to a target host transient memory;
executing a third quantity of store components on the target host, wherein the third quantity is limited by a store threshold parameter, and wherein each store component transfers to the target database a data package from target host transient memory, as stored by the receive component; and
executing a monitor component to monitor performance of the source database, the source host transient memory, the target host transient memory, and the target database, and responsively, according to a predefined state table, changing a quantity of at least one of the first quantity of extraction components, the second quantity of send components, and the third quantity of store components.

2. The method of claim 1, wherein states specified in the predefined state table are defined as being less than or greater than a given value for a maximum target performance.

3. The method of claim 1, wherein states specified in the predefined state table are defined as being less than a target minimum performance, within an optimal performance range, or greater than a maximum performance.

4. The method of claim 1, wherein changing the first quantity of the extraction components comprises changing the extraction threshold parameter, changing the second quantity of the send components comprises changing the send threshold parameter, and changing the third quantity of the store components comprises changing the store threshold parameter.

5. The method of claim 1, wherein the first quantity of extraction components includes two or more components that operate in parallel to transfer chunks of data from a chunk queue to a source local map.

6. The method of claim 1, wherein the first quantity of extraction components includes two or more components operating in parallel to select data from a single table of the source database, allocating the data according to a modulo ("MOD") parameter.

7. The method of claim 1, wherein the data include one or more of table rows, table columns, collections of JSON-formatted objects, stored procedures, indexes, and views.

8. The method of claim 1, wherein the monitor component is further configured to receive and store status indicators of package progress from the source database, to the source host transient memory, to the target host transient memory, and to the target database, in order to perform recovery in the event of a component or network failure by resending a lost package.

9. A system for migrating data from a source database of a source host to a target database of a target host, the system comprising:
the source host, comprising a processor and non-transient memory including instructions that when executed on the processor perform the steps of: executing a first quantity of extraction components, wherein the first quantity is limited by an extraction threshold parameter, and wherein each extraction component transfers a portion of the data as a data package from the source database to a source host transient memory; executing a second quantity of send components, wherein the second quantity is limited by a send threshold parameter, wherein each send component transmits a data package from the source host transient memory, as stored by an extraction component of the source host, to a receive component on the target host, and wherein each receive component transfers a data package received from a send component to a target host transient memory;
the target host, comprising a processor and memory including instructions that when executed on the processor perform steps of: executing a third quantity of store components, wherein the third quantity is limited by a store threshold parameter, and wherein each store component transfers to the target database a data package from target host transient memory, as stored by the receive component of the target host; and a manager host, comprising a processor and memory including instructions that when executed on the processor perform steps of: executing a monitor component to monitor performance of the source database, the source host transient memory, the target host transient memory, and the target database, and responsively, according to a pre-defined state table, changing a quantity of at least one of the first quantity of extraction components, the second quantity of send components, and the third quantity of store components.

10. The system of claim 9, wherein states specified in the predefined state table are defined as being less than or greater than a given value for a maximum target performance.

11. The system of claim 9, wherein states specified in the predefined state table are defined as being less than a target minimum performance, within an optimal performance range, or greater than a maximum performance.

12. The system of claim 9, wherein changing the first quantity of the extraction components comprises changing the extraction threshold parameter, changing the second quantity of the send components comprises changing the send threshold parameter, and changing the third quantity of the store components comprises changing the store threshold parameter.

13. The system of claim 9, wherein the first quantity of extraction components includes two or more components that operate in parallel to transfer chunks of data from a chunk queue to a source local map.

14. The system of claim 9, wherein the first quantity of extraction components includes two or more components operating in parallel to select data from a single table of the source database, allocating the data according to a modulo ("MOD") parameter.

15. The system of claim 9, wherein the data includes one or more of table rows, table columns, collections of BON-formatted objects, stored procedures, indexes, and views.

16. The system of claim 9, wherein the monitor component is further configured to receive and store status indicators of package progress from the source database, to the source host transient memory, to the target host transient memory, and to the target database, in order to perform recovery in the event of a component or network failure by resending a lost package.

* * * * *